Nov. 16, 1965  J. B. PEGRAM  3,217,728
TORQUE MOTOR SERVO VALVE ASSEMBLY
Filed Nov. 13, 1962  2 Sheets-Sheet 1
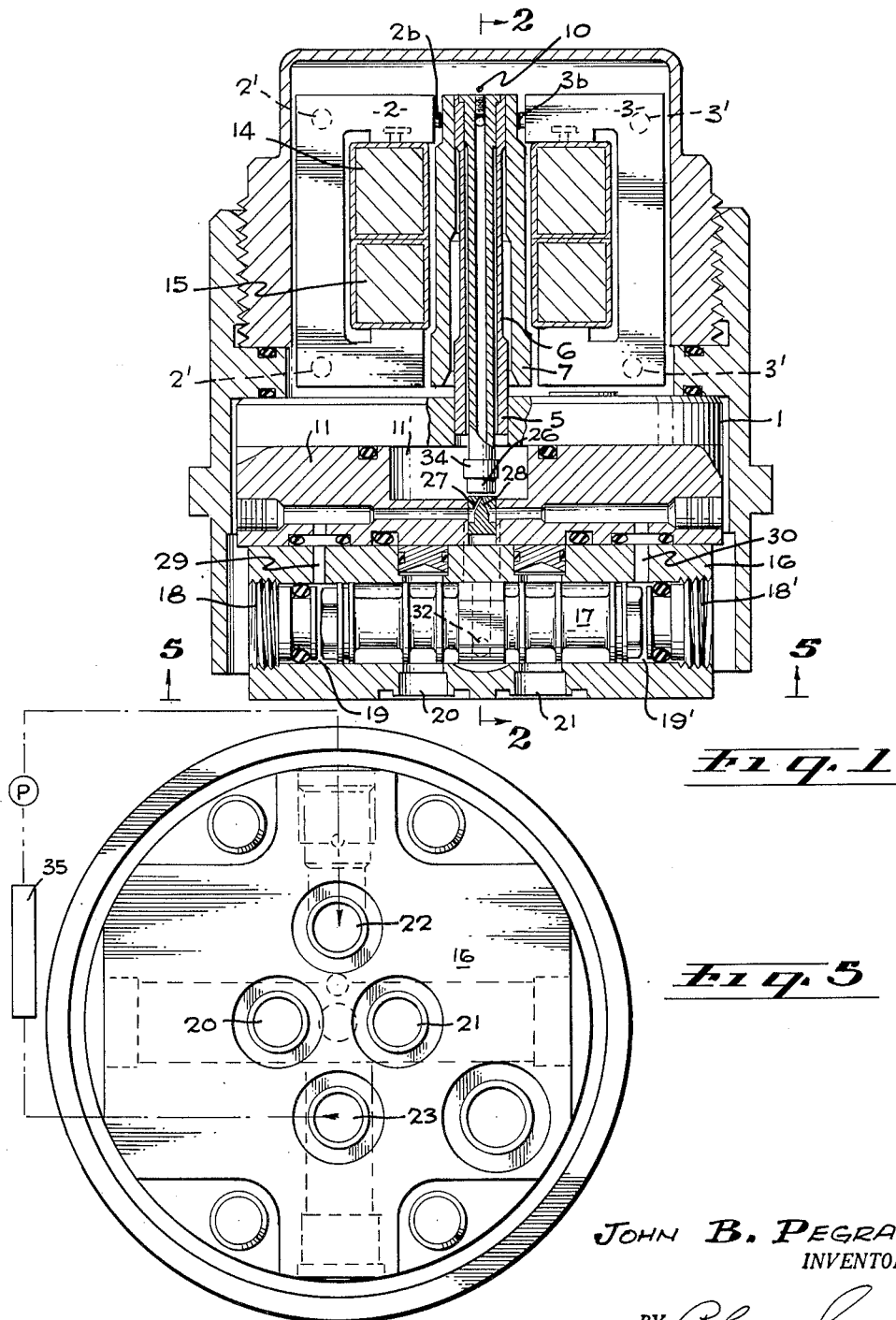
JOHN B. PEGRAM
INVENTOR.
BY
ATTORNEY

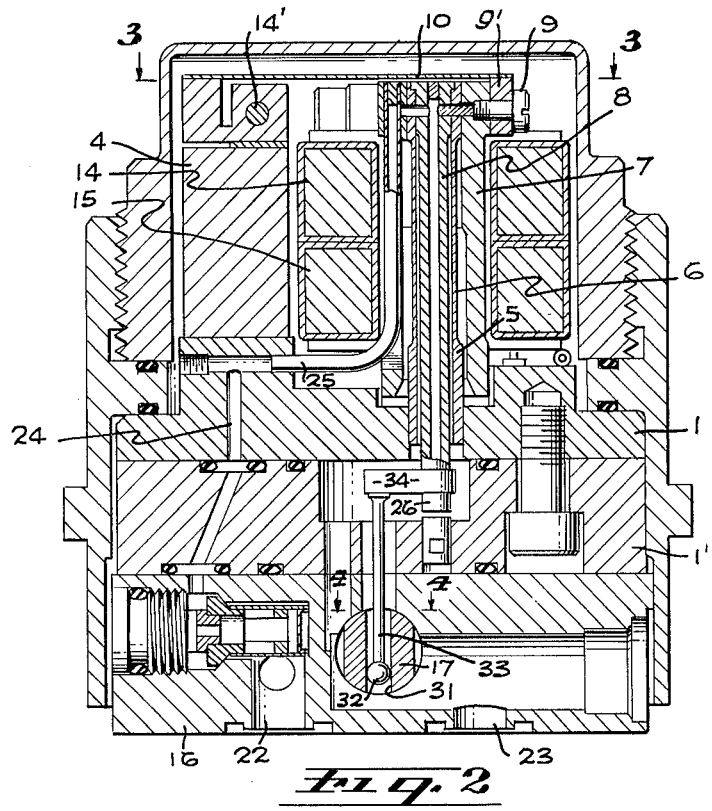
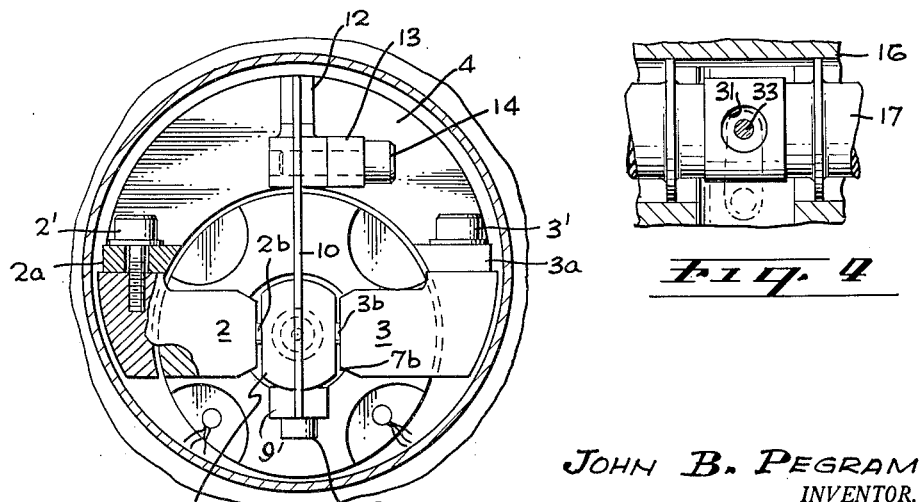

United States Patent Office 3,217,728
Patented Nov. 16, 1965

3,217,728
TORQUE MOTOR SERVO VALVE ASSEMBLY
John B. Pegram, Los Angeles, Calif., assignor to American Brake Shoe Company, New York, N.Y., a corporation of Delaware
Filed Nov. 13, 1962, Ser. No. 236,899
7 Claims. (Cl. 137—83)

This invention relates to a torque motor and to a torque motor jet valve asembly. It is well known to employ electromagnetic motors to actuate a valve member to modify the pressure in the fluid jet which acts as a first stage of a two-stage servo valve. Such devices are described in such patents as Atchley 2,884,907 and Atchley 2,962,611.

In such structure the valve member which modulates the pressures in the first stage jet is a pendulum-mounted jet member of the first stage which has a transverse acceleration sensitivity, here referred to as a sensitive axis. Thus, the valve will report a spurious signal when accelerated in its sensitive axis.

It is an object of my invention to produce such a system which has a minimal acceleration response in all axes and thus may be termed acceleration insensitive.

I accomplish this objective by suspending the pendular valve member so that its center of oscillation in the plane of its sensitive axis is about an axis adjacent the first stage jet. Thus, upon acceleration, displacement of the valve member at the jet is minimized and, ideally, removed, and no modulation of the pressure in the jet occurs due to an acceleration imposed on the system.

In my preferred embodiment, I so distribute the masses of the pendular jet and of the attachments thereto so that the summation of the forces above and below the apparent axis of rotation is so distributed that the end of the jet of the first stage valve does not move substantially and, in the ideal case, does not move at all, as will be more fully described below.

It is a further object of my invention to so construct the torque motor as to reduce the sensitive axis of the pendular member to one plane and to make the pendular member substantially insensitive to acceleration in planes perpendicular to the plane of said sensitive axis.

It is a further object of my invention to construct the structure of the permanent magnet and polar members of the torque motor so as to permit the individual adjustability of each pole.

These and other objects of my invention will be understood by the following description, taken together with the drawings, of which:

FIG. 1 is a section through the torque motor of my invention, shown in combination with a servo-valve employing one form of first stage jet valve such as is illustrated in the aforementioned Atchley patents;

FIG. 2 is a section taken on line 2—2 of FIG. 1;
FIG. 3 is a section taken on line 3—3 of FIG. 2;
FIG. 4 is a section taken on line 4—4 of FIG. 2;
FIG. 5 is a view on line 5—5 of FIG. 1.

In FIG. 1 the base 1 carries a C-shaped permanent magnet 4 to which two pairs of pole pieces 2 and 3 are connected. The C-shaped pole pieces are mounted on screws 2′ and 3′ passing through oversize bores in the brackets 2a and 3a, positioned on the ends of the C-shaped permanent magnet. A tube 5, having a reduced flexible portion 6, is rigidly positioned at one end in the base 1. The elongated armature 7 is suspended at the top of the tube 5 co-axially with tube 5. The armature is hollow and slotted and squared off on its exterior surface adjacent the pole faces, to present flat faces 7a and 7b opposite the faces of the pole pieces 2 and 3 (see FIGS. 1 and 3). The pendular tube 8 is also connected to the tube 5 and the armature 7 at the top of the tube 5 by the screw 9 (see FIGS. 1, 2 and 3) and is spaced from the wall of tube 5. A flexible wire 10 is connected to the spacer 9′ mounted on the armature 7 by means of screw 9 and is connected to the top of the tube 8 and the armature 7 and tube 5 and extends in a plane perpendicular to the plane of deflection of said tube 8, as set forth below (see FIGS 2 and 3). The wire 10 at its other end is connected to the notched flexure 12, mounted on bracket 13 by means of the stud 14′. The bracket 13 is mounted at the top of the C-shaped magnet 4. The electromagnetic field coils 14 and 15 are mounted between the pole pieces 2 and 3 and surround the armature (see FIGS. 1, 2 and 3). The magnetic characteristics of the permanent magnets, pole pieces 2 and 3, armature 7, tubes 5 and 8, and coils 14 and 15 are fully described in the Atchley patents referred to above and are so employed in the torque motor of this application.

The two-stage valve shown in FIGS. 1, 2 and 4 is in construction, except for the details described below, in all the material and functional parts substantially the same as described in the above Atchley patents.

The sleeve block 16 carries a spool 17 placed between stops 18 and 18′, to provide a control chamber 19 and 19′ at each end of the spool. The spool operates in combination with passageways and two ports 20 and 21, connected to the load, and port 22 connected to the inlet, and 23 connected to the return to a pressure fluid source. The inlet 22 is also connected by means of passageways 24 and flexible tube 25 to the top of the tube 5. Positioned on top of the sleeve block 16 is a block 11, carrying ports which communicate with the control chambers 19 and 19′ and the receptor jets 27 and 28. The tube 8 terminates in an ejector jet nozzle 26, which protudes into the notch 11′ adjacent the receptor jets. The porting of the spool block 16 is the same as for the spool assembly of the above Atchley patents.

When the coils 14 and 15 are not differentially energized, the nozzle 26 is positioned centrally between the receptor jets 27 and 28, which are connected by passageways 29 and 30 to the control pressure chambers 19 and 19′.

If the tube 8 and the nozzle 26 are not centered between the axis of receptor jets 27 and 28, an adjustment of the flexure 12 by bending the flexure at the notch will introduce a force in the wire 10 to move the tube 8 to the central position. If the bend at the notch is clockwise in the plane, as shown in FIG. 3, the tube 8 moves to the left in the plane, as shown in FIG. 3, or if the bend is counterclockwise, the tube is moved to the right.

The spool 17, in the form of a bored flat block, carries a central bore 31. The bore 31 carries a ball 32, making a close but slideable fit in the bore 31, and is connected by a flexible rod 33 and bracket 34 to the tube 8 to introduce a feedback force from the spool movement to the armature, as is fully set forth in the above Atchley patents.

When the signal current is passed through 14 and 15 so as to differentially energize the coils 14 and 15, a force is imposed in the armature which flexes the tube 5 and causes an angular displacement of the tube 8 of the jet nozzle 26 in the plane of FIG. 1. Assume that the polarization of the magnet and the relative magnitude of the currents in 14 and 15 cause a deflection of the armature in a clockwise direction as FIG. 1 is viewed. The ejector nozzle 26 will thus move to the left as shown in FIG. 1. The pressure in the receptor jet 27 will rise and that in 28 will fall. The spool will move to valve fluid from 22 to the load port, either 21 or 20, and return the fluid through 23 to the supply (see FIG. 5). The actuation of the spool valve and its functions are as described in the aforementioned Atchley patents.

In assembling or adjusting the structure, the pole pieces may be adjusted by loosening screws 2' and 3', by sliding the top or bottom pole pieces, and by bending the flexure 12 at the notch until the nozzle is centered midway between the receptor jets 27 and 28, and the top and bottom air gaps are all equal in length between the pole faces and the opposing flat faces of the armature.

It will be observed that the only axis of sensitivity to an accelerating force on the unit is in the plane of FIG. 1 and in a direction transverse to the axis of the tube 8. In the plane of FIG. 1, the longitudinal rigidity of the tube 5 will prevent a deflection in such longitudinal direction. The wire 10 acts as a compression and tension member to oppose any deflection of the top of tube 8 in a direction perpendicular to the plane of FIG. 1.

Thus, the possible deflection of the tube 8 at the upper end of the tube is in the plane of FIG. 1, whose degree is limited by the stops 2b and 3b. This deflection will be the result of a force in a direction which will tend to move the top end of the tubes 5 and 8 in the plane of FIG. 1 to the right or left, depending on the direction of the accelerating force. Since the lower end of the tube 5 is rigidly fixed to the base, and the top of 5 rigidly fixed to the tube 8, the tube 5 tends to take a slanted position, that is, it tends to translate and rotate about some axis, here referred to as its apparent axis of rotation.

For example, assume that pole face 2 is connected to the north pole of the permanent magnet and the complementary pole face 3 (see FIGS. 1 and 3) to the south pole of the magnet. By reason of their position respectively as the north and south poles of a C-shaped magnet 4, when a signal current magnetizes the armature 7, so that the upper end of the armature 7 is a north pole of the magnetic field in the armature, the lower end being a south pole, the lower end of the armature is attracted to the lower pole piece 2 to the left thereof, as seen in FIG. 1, and repelled from the lower pole piece 3 to the right. The upper end of the armature is repelled from the upper pole face 2 and attracted to the upper pole face 3, to cause a clockwise deflection of the armature to cause the nozzle 26 to move to the left. If the poles are polarized in a reverse polarity, the opposite rotation occurs.

I have found that, by distributing the masses of the system composed of the tubes 5 and 8 and the attachments thereto, the apparent axis of rotation may be made vertical and be such that nozzle 26 will not move in any substantial degree to make a substantial modification of the pressures in the receptor jets and ideally be positioned adjacent to and midway between the receptor jets.

In order to determine this distribution with reasonable accuracy, after calculation of the mass distribution has directed the original design, the torque motor, carrying the tube 8 and the bracket 34 and rod 33, is mounted separately from the block 11' and 16 and subjected to an acceleration in the plane of FIG. 1, and the deflection of the bottom of nozzle 26 is noted. If insufficient mass is present in the upper portion of the assembly, the deflection will be in one direction, and if excessive in the lower portion of the assembly, the deflection will be in the opposite direction.

By means of the aforesaid construction, the protruding end of the pendular tube 8 is acceleration insensitive in each of the three spatial axes.

Masses, by means of solder, are added to bracket 34 or to the top of the tube 5, until the forces acting at the top and the bottom of the tube 5 are in such relation that the nozzle 26 is not deflected to a substantial degree. In such case, the vector sum of the forces acting on the tube assembly, summed at the nozzle, is substantially zero.

If it has required added weight to the top of tube 5 to hold the nozzle 26 from displacement, the structure is modified so that weight is added along the tube 8 above the apparent axis of rotation in an amount equivalent to the experimentally determined weight required to be added as described above. If the addition of solder at bracket 34 is required as stated above, in the further design such weight is added to the weight of the bracket or an equivalent weight on other portions of the pipe assembly below the apparent axis of rotation, in an amount equivalent to the experimentally determined mass added to the bracket 34.

Instead of connecting the receptor jets to a spool of a second stage, I may, as set forth in the aforesaid Atchley patents, connect them to another motor member, other than the spool of a second stage valve, for example, to the piston of a fluid motor, which is displaced when the pressures in the receptor jets become unbalanced, as described in the Atchley Patent 2,962,611.

While I have described a particular embodiment of my invention for purposes of illustration, it should be understood that various modifications and adaptations thereof may be made within the spirit of the invention, as set forth in the appended claims.

I claim:

1. A torque motor comprising a base, a permanent magnet mounted on said base, said permanent magnet having four pole faces in two pairs spaced longitudinally of said magnet, a hollow, flexible tube mounted at one end in said base, a pendular member positioned interiorly of and spaced from the wall of said flexible tube and projecting from one end of said flexible tube at the base, and connected to said flexible tube at the other end of said flexible tube, an armature extending along the longitudinal length of the flexible tube and connected adjacent one end of the armature to the flexible tube and positioned between said pole faces and connected to said flexible tube at said other end; said pairs of pole faces being also spaced longitudinally of said armature and said flexible tube and a pair of electromagnetic field coils positioned about said armature.

2. In the torque motor of claim 1, a flexure, means connecting one end of said flexure to said other end of said tube and to said armature, said flexure being rigidly fixed at the other end thereof and said flexure being flexible in a region between its ends about an axis parallel to the axis of said tube at its mounted end.

3. In the torque motor of claim 1, in which said pendular member is a tube, a fluid connection to said tube, the protruding end of said tube carrying a nozzle.

4. In the torque motor of claim 3, a flexure, means connecting one end of said flexure to said other end of said tube and to said armature, said flexure being rigidly fixed at the other end thereof and said flexure being flexible in a region between its ends about an axis parallel to the axis of said tube at its mounted end.

5. A torque motor according to claim 1, a flexible connection between the said other end of said tube and a fixed point on said base.

6. The torque motor of claim 1, in which said pendular member is a tube, a fluid connection to said tube, the protruding end of said tube carrying a nozzle, a pair of receptor jets positioned adjacent said nozzle, said nozzle being positioned between said receptor jets.

7. A torque motor comprising a base, a permanent magnet mounted on said base, said permanent magnet having four pole faces in two pairs spaced longitudinally of said magnet, a hollow flexible tube mounted at one end in said base, a pendular member positioned interiorly of and spaced from the wall of said flexible tube and projecting from one end of said flexible tube at the base, and connected to said flexible tube at the other end of said flexible tube, an armature extending along the longitudinal length of the flexible tube and connected adjacent one end to the flexible tube, said pairs of pole faces being also spaced longitudinally of said tube and armature, said pendular member mounted on said flexible tube for angular deflection in a plane, and a flexible wire connected to said other end of said tube and to a fixed point on said base and extending in a plane perpendicular to the said plane of deflection.

References Cited by the Examiner

UNITED STATES PATENTS

| | | | |
|---|---|---|---|
| 2,884,907 | 5/1959 | Atchley | 137—625.24 XR |
| 2,994,016 | 7/1961 | Tibbetts et al. | 317—172 |
| 3,003,476 | 10/1961 | Thomas | 137—625.64 XR |
| 3,029,830 | 4/1962 | Klover et al. | 251—30 XR |

FOREIGN PATENTS 974,837  10/1950  France.

M. CARY NELSON, *Primary Examiner.*

MILTON KAUFMAN, *Examiner.*